219-121. SR 8-19-75 XR 3,900,593

United States Patent [19]

Herczog et al.

[11] 3,900,593

[45] Aug. 19, 1975

[54] METHOD OF PRODUCING MAGNETIC METAL OXIDE FILMS BONDED TO A SUBSTRATE

[75] Inventors: Andrew Herczog, Painted Post; Margaret M. Layton; Dale W. Rice, both of Horseheads, all of N.Y.

[73] Assignee: Corning Glass Works, Corning, N.Y.

[22] Filed: June 16, 1972

[21] Appl. No.: 263,586

[52] U.S. Cl.......... 427/53; 204/DIG. 11; 219/121 L; 427/130

[51] Int. Cl............................................. H01f 10/00

[58] Field of Search................. 117/93.31, 235–240; 204/DIG. 11; 219/121 L

[56] References Cited

UNITED STATES PATENTS

| | | | |
|---|---|---|---|
| 2,707,688 | 5/1955 | Blackman | 117/237 |
| 3,310,423 | 3/1967 | Ingham | 117/105.2 X |
| 3,545,997 | 1/1966 | Hochberg | 117/235 X |
| 3,546,675 | 12/1970 | Chow et al. | 117/235 X |
| 3,576,672 | 4/1971 | Harris et al. | 117/235 |
| 3,620,841 | 2/1970 | Comstock | 117/235 X |
| 3,703,411 | 11/1972 | Melezoglu | 117/235 X |
| 3,795,542 | 3/1974 | Halaby | 117/49 |

OTHER PUBLICATIONS

Haun, pp. 82–92, *Laser Application*, 5–68, 219–121 Laser, *IEEE Spectrum*.

D'Haenens et al., *Lasers and their Application*, pp. 828–832, 11–62, Journal of the SMPTE, Vol. 71.

*Primary Examiner*—Bernard D. Pianalto
*Attorney, Agent, or Firm*—Water S. Zebrowski; Clarence R. Patty, Jr.

[57] ABSTRACT

A method of producing magnetic metal oxide films bonded to an inorganic, non-magnetic substrate comprising the steps of applying a coating to the surface of the substrate, which coating consists of a very fine magnetic metal oxide powder dispersed in a suitable liquid. The applied coating and substrate are then heated to a temperature sufficient to evaporate the liquid constituent of the coating and form a thin, dense, magnetic, metal oxide film chemically bonded to the substrate.

22 Claims, 3 Drawing Figures

METHOD OF PRODUCING MAGNETIC METAL OXIDE FILMS BONDED TO A SUBSTRATE

BACKGROUND OF THE INVENTION

This invention relates to a method of producing magnetic recording and storage devices such as disks, drums, rods and the like. Such magnetic devices are useful in data processing computers for storing digital information or in any other equipment where analog or digital information storage is desired.

Heretofore, binder and filler materials such as epoxies, urethanes, vinyls, or the like were used in the production of magnetic recording and storage devices for bonding particles of a magnetic material to each other and to non-magnetic substrates. The magnetic films of such devices were relatively soft and had relatively low abrasion resistance. In addition, the use of such bonding materials required polishing of the applied combination of materials thus necessitating additional equipment and materials while also being time consuming, whereby the cost of manufacturing such devices was significantly increased.

SUMMARY OF THE INVENTION

It is, therefore, an object of this invention to provide a simple and economic method of producing magnetic devices suitable for information recording and storage, which method and devices overcome the heretofore noted disadvantages.

Briefly, according to this invention, a suitable inorganic, non-magnetic substrate or support member is provided. A coating consisting of a very fine magnetic metal oxide powder dispersed in a suitable liquid vehicle is applied to a desired surface of the substrate. The coating and substrate combination is then heated to a temperature sufficient to evaporate the liquid portion of the coating. After the liquid portion of the coating is volatilized, the remaining film of magnetic metal oxide is thereafter chemically bonded to the substrate.

In certain instances, heating the substrate-film combination to the temperature necessary to achieve a good chemical bond therebetween may have deleterious effects upon the film, the substrate, or both. In such cases it may be desirable to first heat the combination to substantially the highest temperature possible without causing such deleterious effects and, thereafter, applying localized heat only to the substrate-film interface to increase the temperature thereof sufficiently to achieve the desired chemical bond.

Additional objects, features and advantages of the present invention will become apparent to those skilled in the art from the following detailed description and attached drawing, on which, by way of example, only the preferred embodiments of the present invention are illustrated.

DETAILED DESCRIPTION OF THE INVENTION

Figure 1:
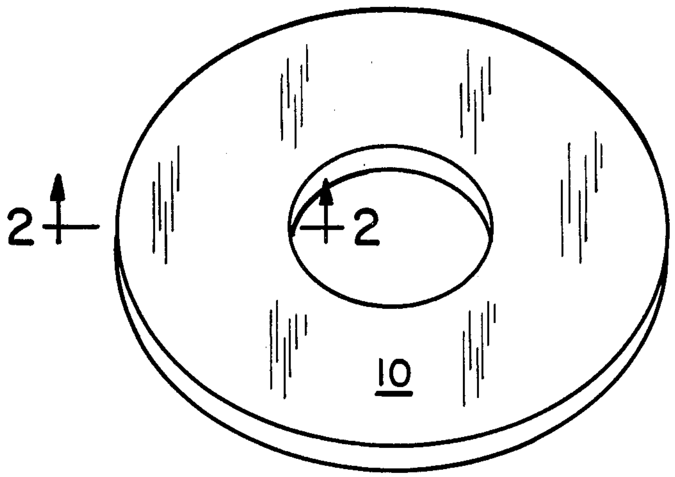
FIG. 1 is an oblique view of a magnetic recording and storage device built in accordance with the teaching of the present invention.
Figure 2:
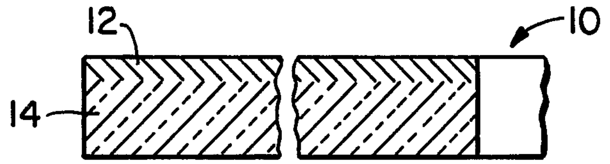
FIG. 2 is a fragmentary cross-sectional view taken along line 2—2 of FIG. 1.

Referring to FIG. 1, there is shown a magnetic recording and storage disk 10. In the fragmentary cross-sectional view of FIG. 2, magnetic disk 10 is shown having a magnetic metal oxide film 12 chemically bonded to substrate 14. The thickness of the magnetic film as shown in the drawing is greatly increased with respect to the substrate thickness for better illustration of the invention. The substrate or support member 14 may be provided in any suitable shape and from any suitable material that can withstand the high temperatures encountered in the method of this invention. For example, the substrate may be in the shape of a disk, rod, drum, or the like made from a non-magnetic material, such as, but not limited to, glass, glass-ceramic or ceramic. Substrates especially suited for use with the method of the present invention may be formed of ion-exchange strengthenable glass or glass-ceramic. There are several suitable ion-exchange processes well known in the art. A basic discussion of such processes may be found in a publication entitled "Stresses in Glass Produced by Non-Uniform Exchange of Monovalent Ions" by S. F. Kistler, published by the Journal of the American Ceramic Society, February 1962, pages 52–68.

A mixture of a very fine magnetic metal oxide powder dispersed in a suitable liquid or organic vehicle is prepared and a coating thereof is applied to a desired surface of the substrate. The substrate and coating combination is then heated to a temperature sufficient to volatilize the liquid or organic vehicle thereby leaving a thin dense film of metal oxide powder. The substrate-film combination is then further heated to a temperature sufficient to chemically bond the film to the substrate. Depending upon the substrate and film materials employed, the magnetic metal oxide powder may either be bonded to the substrate in its original particulate form or it may be sintered and bonded to the substrate as a solid, non-particulate film. Both solid and particulate films provide high quality magnetic devices.

Metal oxide powders suitable for use in the present invention include but are not limited to magnetite ($Fe_3O_4$), gamma ferric oxide ($\gamma$-$Fe_2O_3$), and magnetite or gamma ferric oxide in combination with one or more of the following metals: cobalt, nickel, copper, zinc, magnesium and manganese. In addition, metal oxides which can be converted to magnetic materials are also suitable. An example of such materials is non-magnetic alpha ferric oxide ($\alpha$-$Fe_2O_3$) which may be converted to magnetic magnetite or gamma ferric oxide. Two co-pending patent applications Ser. No. 151,356, U.S. Pat. No. 3,795,542, and Ser. No. 151,388, both applications entitled "Method of Making a Magnetic Recording and Storage Device", by Sami A. Halaby, Neal S. Kenny and James A. Murphy, filed June 9, 1971, describe suitable methods for converting nonmagnetic alpha ferric oxide to either magnetite or gamma ferric oxide.

To produce a thin dense high quality magnetic film, the metal oxide powder should have a grain size not greater than about 1 micrometer (10,000 A) and preferably the grain size should be less than about 0.1 micrometer (1000 A). Magnetic materials having a particle or grain size less than about 0.01 micrometer (100 A) become superparamagnetic and, therefore, are completely unsuitable for use as a storage medium. Consequently, if a suitable magnetic storage device is to be produced having a film of magnetic metal oxide bonded to the substrate in its original powder form, the grain size of the metal oxide powder should be at least about 0.01 micrometer. However, the grain size of the metal oxide powder may be substantially less than 0.01 micrometer if the powder is sintered into a solid, non-particulate film bonded to the substrate.

Excellent results have been obtained by using magnetic metal oxide powders produced by a plasma arc process. The plasma arc process may be used to produce very small grain excellent quality magnetic and non-magnetic high purity metal oxide powders. The grain size of metal oxide powders produced by this process may be as small as 0.002 micrometers or as large as 0.5 micrometers. The above noted plasma arc process for producing high purity metal oxide powders is described in the copending patent application entitled "Method for Producing Metal Compounds", by Dale W. Rice, Ser. No. 135,973, filed Apr. 21, 1971, and Now U.S. Pat. No. 3,848,068, which application is expressly incorporated herein by reference.

There are many liquids or vehicles suitable for use with this invention including but not limited to water, screening oil, and alcohol. A readily available high quality commercial screening oil known as Drakenfeld No. 882 has been found to be particularly satisfactory. This screening oil is produced by the Drakenfeld Division (Imperial Color and Chemical Dept.) of Hercules, Inc., Washington, Pennsylvania.

The coating of the metal oxide-liquid mixture may be applied to the desired surface of the substrate by any suitable method including but not limited to painting, silk screening, spraying, swabbing, and dipping. In applying the coating, it is important to be certain that the substrate is thoroughly coated by the mixture and that there are no bubbles or voids in the coating.

The actual bonding temperature of the oxide film to the substrate will depend on the softening or melting points of both the film and the substrate. If the softening or melting point of the substrate material is lower than the softening or melting point of the oxide film material, the controlling temperature will be determined by the substrate material. If reverse conditions exist, the controlling temperature will be determined by the film material. It has been found that, to achieve a strong chemical bond therebetween, the interface between the film of magnetic metal oxide and the substrate must be heated to a temperature up to the softening or sintering temperature of the substrate and film material, whichever is lower. For example, if ion-exchange strengthened glass of the type hereinabove noted has been selected as the substrate material, and magnetite has been selected as the magnetic metal oxide, a very strong chemical bond can be achieved by heating the interface between the metal oxide film and substrate to a temperature just below the softening point of the glass or, in this specific example, to a temperature of about 700°C. A bond as hereinabove described is herein referred to as a chemical bond.

It should be noted, that the oxide film may be bonded to the substrate during the same heating step employed for evaporation of the liquid or vehicle, or during a separate heating step. It should also be noted that suitable films may be produced by employing more than one coating and heating step.

Normally, heating the interface to the temperature necessary to achieve a chemical bond, it accomplished by simply heating the entire substrate and magnetic metal oxide film combination to the required temperature. However, under certain circumstances subjecting the complete substrate-film combination to the necessary temperature for a sufficient time to obtain a good chemical bond could have deleterious effects on the film, substrate or both. Therefore, in such circumstances it may be desirable to heat the combination structure to the highest possible temperature without causing deleterious effects on the structure, and thereafter only heat the interface to the temperature necessary to achieve a good chemical bond.

Figure 3:
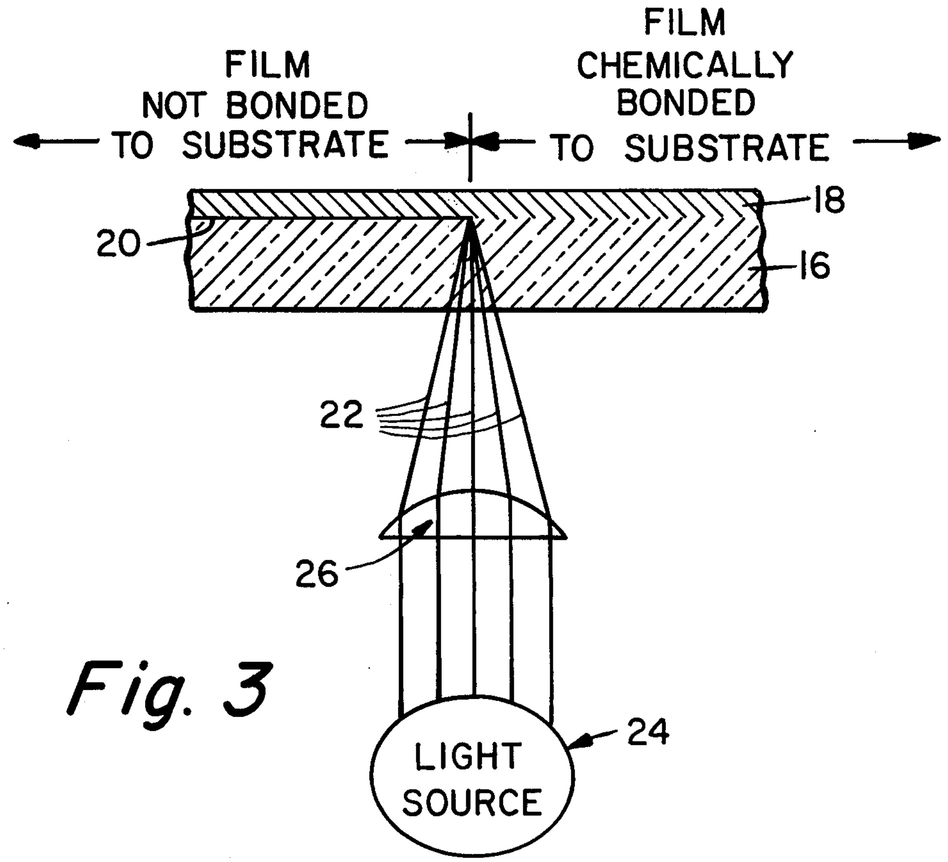
FIG. 3 is an illustration of a means of applying localized heat to the substrate-magnetic film interface in accordance with the teaching of one embodiment of the present invention.

A particularly suitable method of only heating the interface is described with reference to FIG. 3 where there is shown glass substrate 16, to one surface of which magnetic metal oxide film 18 has been applied. The magnetic metal oxide film 18 is applied by the methods heretofore described, and may be either in discrete particle form or sintered into a solid form. The combination substrate and magnetic metal oxide film is then heated to a temperature substantially equal to the annealing point of the glass substrate. Thereafter, only interface 20 between oxide film 18 and substrate 16 is heated to a temperature sufficient to result in a strong chemical bond therebetween. The preheating of the combination structure to the annealing point of the glass is only necessary to avoid breakage of substrate 16 due to thermal shock when interface 20 is heated to the higher bonding temperature. Interface 20 is heated to the necessary temperature by focusing light rays 22 from xenon arc heat lamp source 24 with lens system 26 on interface 20. Rays 22 are readily transmitted through transparent substrate 16 to interface 20 where they impinge on the interface surface of opaque magnetic metal oxide film 18 and are absorbed. Accordingly, interface 20 may be heated to a very high temperature without excessive heating of the total substrate or magnetic metal oxide film. It should be noted, however, sources of light energy other than the xenon light could be focused upon the interface such as, for example, a laser, an iodine cycle incandescent light, or the like.

The following specific examples, are set out to illustrate the present invention.

EXAMPLE 1

A coating comprising a powder of magnetite well mixed and dispersed in a screening oil was silk screened onto the surface of a glass substrate by means of a rubber squeegee. The magnetite powder had a particle size of between about 0.1 micrometer and about 1 micrometer, and the screening oil was a commercial product available under the name of Drakenfeld No. 882. The glass from which the substrate was made is one having the following composition in percent by weight: 61.4 $SiO_2$, 12.7 $Na_2O$, 3.6 $K_2O$, 3.7 MgO, 0.2 CaO, 16.8 $Al_2O_3$, 0.8 $TiO_2$, and 0.8 $As_2O_3$.

The substrate with the magnetite and screening oil coating was heated in an oven to a temperature of approximately 700°C and maintained thereat for approximately 20 hours. The combination structure was then allowed to cool to room temperature. The resulting structure was a device having a particulate alpha ferric oxide film of approximately 0.15 micrometer in thickness chemically bonded to the substrate. The alpha ferric oxide film was then reduced to a film of magnetite by subjecting it to a reducing atmosphere of hydrogen and water mixed with nitrogen at a temperature of about 525°C for approximately 1 hour. The reduction atmosphere had a hydrogen to water pressure ratio of about 2.4:1 and was obtained by bubbling a mixture of 8% hydrogen by volume and 92% nitrogen by volume through water while said nitrogen, hydrogen and water were maintained at approximately 25°C. Such a method of reducing alpha ferric oxide to magnetite is described in detail in the hereinabove noted Halaby-Kenny-Murphy patent applications.

EXAMPLE 2

A coating comprising a very fine power of manganese zinc ferrite well mixed and dispersed in Drakenfeld No. 882 screening oil was applied to the surface of a glass substrate by silk screening with a rubber squeegee. The composition of the substrate material was the same as described in Example 1. The manganese zinc ferrite powder had a grain size of between about 0.01 micrometer and about 0.1 micrometer. The substrate with the coating containing the ferrite powder was preheated to a temperature of about 630°C. Rays from a xenon arc lamp were then focused by means of an elliptical mirror through the glass substrate and on the metal oxide film and substrate interface for approximately 5 minutes. The resultant combination structure was a magnetic device having a particulate manganese zinc ferrite film of about 0.2 micrometer in thickness chemically bonded to the glass substrate.

EXAMPLE 3

A coating comprising a very fine powder of gamma ferric oxide well mixed and dispersed in Drakenfeld No. 882 screening oil was applied to the surface of a glass substrate by silk screening with a rubber squeegee. The composition of the substrate material was the same as described in Example 1. The gamma ferric oxide powder had a grain size of between about 0.01 micrometer and about 0.1 micrometer. The substrate with the coating containing the gamma ferric oxide was preheated to a temperature of about 630°C. Rays from a xenon light were then focused by means of an elliptical mirror through the glass substrate on the metal oxide film and substrate interface for approximately 5 minutes. The processing caused the gamma ferric oxide to convert to alpha ferric oxide which was then reduced to a film of magnetite in exactly the same manner described in Example 1.

Although the present invention has been described with respect to specific details of certain embodiments thereof, it is not intended that such details be limitations upon the scope of the invention except insofar as is set forth in the following claims.

We claim:

1. A method of forming a magnetic film device comprising the steps of providing an inorganic, non-magnetic substrate, applying to said substrate a coating of a magnetic metal oxide powder dispersed in a liquid vehicle, heating said substrate and applied coating to a temperature corresponding to at least the vaporizing temperature of said liquid to volatilize said liquid and leave a film of magnetic metal oxide powder on said substrate, and bonding said film of magnetic metal oxide to said substrate by further heating at least the interface between said film and said substrate to a temperature up to the lower of the softening or sintering temperature of the substrate and film materials for a time sufficient for said film itself to chemically bond to said substate.

2. The method of claim 1 wherein said powder is a metal oxide selected from the group consisting of magnetite; gamma ferric oxide; magnetite in combination with at least one of cobalt, nickel, copper, zinc, manganese, and magnesium; gamma ferric oxide in combination with at least one of cobalt, nickel, copper, zinc, manganese, and magnesium; and mixtures thereof.

3. The method of claim 1 wherein the grain size of said magnetic metal oxide powder is between about 100 A and about 1 micrometer.

4. The method of claim 3 wherein said softening or sintering temperature of said substrate material is higher than the sintering temperature of film material further comprising the step of sintering said magnetic metal oxide powder to form a solid, non-particulate metal oxide film on said substrate by heating said substrate and magnetic metal oxide powder to the sintering temperature of said metal oxide.

5. The method of claim 3 wherein said heating of said bonding step comprises focusing light through said substrate onto said interface, said substrate being substantially transparent to said light.

6. The method of claim 1 wherein the grain size of said magnetic metal oxide powder is between about 100 A and about 1000 A.

7. The method of claim 1 wherein said liquid vehicle is a liquid selected from the group consisting of water, alcohol, and screening oil.

8. The method of claim 1 wherein said substrate is formed of material selected from the group consisting of glass, glass-ceramic and ceramic.

9. The method of claim 1 wherein said softening or sintering temperature of said substrate material is higher than the sintering temperature of said film material further comprising the step of sintering said magnetic metal oxide powder to form a solid, non-particulate magnetic metal oxide film on said substrate by heating said substrate and magnetic metal oxide powder to the sintering temperature of said metal oxide.

10. The method of claim 1 wherein said heating of said bonding step comprises focusing light through said substrate onto said interface, said substrate being substantially transparent to said light.

11. A method of forming a magnetic recording and storage device comprising the steps of providing an inorganic, non-magnetic substrate, applying to said substrate a coating of alpha ferric oxide powder dispersed in a liquid vehicle, heating said substrate and applied coating to a temperature corresponding to at least the vaporizing temperature of said liquid to volatilize said liquid and leave a film of alpha ferric oxide powder on said substrate, bonding said film of alpha ferric oxide to said substrate by further heating at least the interface between said film and said substrate to a temperature up to the lower of the softening or sintering temperature of the substrate and alpha ferric oxide for a time sufficient for said film itself to chemically bond to said substrate, and thereafter convering said film of alpha ferric oxide to a film of magnetic iron oxide.

12. The method of claim 11 wherein said magnetic iron oxide film is selected from the group consisting of magnetite and gamma ferric oxide.

13. The method of claim 12 wherein the grain size of said alpha ferric oxide powder is between about b 100 A and about 1 micrometer.

14. The method of claim 13 wherein said softening or sintering temperature of said substrate material is higher than the sintering temperature of alpha ferric oxide further comprising the step of sintering said alpha ferric oxide powder to form a solid, non-particulate alpha ferric oxide film on said substrate by heating said substrate and alpha ferric oxide powder to the sintering temperature of alpha ferric oxide.

15. The method of claim 13 wherein said heating of said bonding step comprises focusing light through said substrate onto said interface, said substrate being substantially transparent to said light.

16. The method of claim 11 wherein the grain size of said alpha ferric oxide powder is between about 100 A and about 1 micrometer.

17. The method of claim 11 wherein the grain size of said alpha ferric oxide powder is between about 100 A and about 1000 A.

18. The method of claim 11 wherein said liquid vehicle is a liquid selected from the group consisting of water, alcohol, and screening oil.

19. The method of claim 11 wherein said substrate is formed of material selected from the group consisting of glass, glass-ceramic, and ceramic.

20. The method of claim 11 wherein said softening or sintering temperature of said substrate material is higher than the sintering temperature of alpha ferric oxide further comprising the step of sintering said alpha ferric oxide powder to form a solid, non-particulate alpha ferric oxide film on said substrate by heating said substrate and alpha ferric oxide powder to the sintering temperature of alpha ferric oxide.

21. The method of claim 11 wherein said heating of said bonding step comprises focusing light through said substrate onto said interface, said substrate being substantially transparent to said light.

22. A method of forming a magnetic recording and storage device comprising the steps of providing a substrate formed of an ion-exchange strengthened glass, applying to said substrate by silk screening a coating of a magnetic metal oxide powder selected from the group consisting of magnetite and gamma ferric oxide, said powder being dispersed in screening oil, heating said substrate and applied coating to the annealing point of said substrate to volatilize said screening oil leaving a film of magnetic metal oxide powder on said substrate, and thereafter bonding said film of magnetic metal oxide to said substrate by further heating the interface between said film and said substrate to the softening point of said glass by focusing light through said substrate on said interface for a time sufficient for said film itself to chemically bond to said substrate, said substrate being substantially transparent to said light.

* * * * *